United States Patent [19]

Hart et al.

[11] Patent Number: 5,378,219
[45] Date of Patent: Jan. 3, 1995

[54] INSULATING ROLL COVER

[75] Inventors: Charles M. Hart, Streetsboro; James D. Rogers, Mantua; Harry L. King, Hudson; John J. Bartholomew, Mentor, all of Ohio

[73] Assignee: Global Consulting, Inc., Painesville, Ohio

[21] Appl. No.: 986,212

[22] Filed: Dec. 7, 1992

Related U.S. Application Data

[60] Division of Ser. No. 719,252, Jun. 27, 1991, Pat. No. 5,205,398, which is a continuation-in-part of Ser. No. 559,736, Jul. 27, 1990, abandoned.

[51] Int. Cl.$^6$ .............................. F27D 23/00
[52] U.S. Cl. ............................ 492/48; 492/50; 492/53; 492/57
[58] Field of Search ............. 492/48, 50, 53, 57; 65/374.13, 253, 374.1, 374.11

[56] References Cited

U.S. PATENT DOCUMENTS

| | | |
|---|---|---|
| 3,116,053 | 12/1963 | Ericsson . |
| 3,334,010 | 8/1967 | Moore . |
| 3,456,931 | 7/1969 | Ermenc et al. . |
| 3,751,195 | 8/1973 | Snow . |
| 3,763,533 | 10/1973 | Blom et al. . |
| 3,802,495 | 4/1974 | Hordis . |
| 3,812,562 | 5/1974 | Lovett .................... 492/48 |
| 3,815,197 | 6/1974 | Sukenik .................. 492/48 |
| 3,852,862 | 12/1974 | Sukenik .................. 492/48 |
| 3,853,525 | 12/1974 | Gorman . |
| 3,853,526 | 12/1974 | Hochart .................. 492/48 |
| 4,174,331 | 11/1979 | Myles . |
| 4,244,781 | 1/1981 | Heckman . |
| 4,352,230 | 10/1982 | Sukenik . |
| 4,547,403 | 10/1985 | Smith . |
| 4,555,492 | 11/1985 | Ekdahl et al. . |
| 4,558,015 | 12/1985 | Ekdahl et al. . |
| 4,596,527 | 6/1986 | Yamada et al. . |
| 4,600,560 | 7/1986 | Vallak . |
| 4,732,796 | 3/1988 | Schatschneider . |
| 4,776,071 | 10/1988 | Yoshizawa . |

FOREIGN PATENT DOCUMENTS

| | | |
|---|---|---|
| 61258781 | 5/1988 | Japan . |
| 62118666 | 3/1989 | Japan . |
| 59253092 | 2/1991 | Japan . |

*Primary Examiner*—Irene Cuda
*Attorney, Agent, or Firm*—John J. Freer

[57] ABSTRACT

An insulating roller cover includes a highly desirable combination of features. The cover is free from asbestos and is therefore of more desirable construction for handling and use. For the roller cover, at least substantially ceramic fiber is highly compressed, providing a dense and refractory, elevated temperature resistant insulating cover. The cover may itself serve as a load bearing surface; or may provide a foundation or protective media for annular discs or 10 sleeve members made of various, load bearing materials. These load bearing materials may be unable to resist direct contact with the shaft due to thermal shock or the differences in their respective expansion and contraction rates. Where impregnant is utilized with the highly compressed fiber, such will often comprise a colloidal substituent.

16 Claims, 3 Drawing Sheets

INSULATING ROLL COVER

CROSS-REFERENCE TO RELATED APPLICATION

This is a divisional, of application Ser. No. 07/719,252, filed Jun. 27, 1991, now U.S. Pat. No. 5,205,398, which application is a continuation in-part of U.S. patent application Ser. No. 559,736 filed Jul. 27, 1990, abandoned.

BACKGROUND OF THE INVENTION

Rolls such as those employed as roller conveyors for use at high temperature can be made from an inner metal shaft that has an outer insulating cover of asbestos. In manufacturing the roll, the asbestos can be supplied as annular discs, sometimes referred to as "washers", which are assembled on the shaft and pressed together, as discussed, for example, in U.S. Pat. No. 3,802,495. In a technically related teaching in U.S. Pat. No. 3,116,053, there is disclosed a roll having asbestos discs compressed onto a tubular shaft, the asbestos discs alternating between thick and thin discs. These are pressed together between end walls by a compressive force produced by hydraulic means. Because the binding agent in the asbestos tends to be destroyed at high temperature, it is important to maintain the discs under the axial pressure between the end walls.

A conveyor roll can also be made by sliding a plurality of asbestos millboard annular discs onto a shaft, i.e., annular discs of a major amount of asbestos fiber and a minor amount of binder such as portland cement. These can then be compressed axially on the shaft. As disclosed in U.S. Pat. No. 3,334,010 the asbestos can be a blend of chrysotile plus amphibole asbestos fibers and the binder can be a cement plus clay mixture. In a somewhat technically related disclosure in U.S. Pat. No. 3,456,931 it is discussed that the surface of the roll can be heated to produce an exterior, ceramic surface on the roll.

It has also been proposed to make the discs from ceramic fiber board, having a binder such as portland cement. These discs can be assembled on a metal shaft and compressed into roller form. However, the binder has a tendency to burn out, thus weakening the cover. Such covers have therefore not met with wide acceptance as a suitable replacement for the asbestos millboard covers.

A proposal has also been made to use glassy fibers for rollers, such as rollers used in drawing sheet glass. In this regard, in U.S. Pat. No. 3,763,533 it has been taught to impregnate mineral fiber with an inorganic binder. Strips of felted fiber can be wound around a roller core, impregnated with binder and heated to dry. Such rolls have however not proven to be sufficiently acceptable to find wide use in replacing asbestos rollers.

It has also been proposed to use mineral fibers in feed rollers for roller tunnel kilns. U.S. Pat. No. 4,596,527 teaches the preparation of fibrous tubes, or sleeves, which can be slipped over a feed-roller steel pipe core. These sleeves ostensibly assist in ease of roller maintenance, as fresh sleeves can be readily slipped onto the pipe core during equipment down time after removal of the spent cover layer, which seemingly is required frequently.

However, concerns over the safety of the working environment, as well as over potential damage to conveyed goods from fugitive binder residues at elevated roll use temperature, continues. There is still a need in industry for an improved insulating roll covering, competitive in ruggedness and long-service life with asbestos covers. Such roll cover should also exhibit desirable insulating characteristic, yet provide a more environmentally safe product by elimination of asbestos.

SUMMARY OF THE INVENTION

There is now manufactured an improved insulating roll cover. The resulting roller not only has an insulating cover, but such a cover which can offer improved insulating property over even prior asbestos covers. Yet the cover is asbestos free for more desirable handling and use. Furthermore, the cover may be free of binders such as cement, thereby eliminating problems with such covers. The new roller can thereby offer the desirable features found in previous insulating rollers, while combining these features with much sought after improvements.

In a broad aspect the invention is directed to a roller especially adapted for use in roller conveying articles, which articles are at substantially elevated temperature, or which articles are being conveyed through a zone of substantially elevated temperature, which roller comprises an inner shaft having at least one dense and refractory, elevated temperature resistant annular insulating cover member of highly compressed at least substantially ceramic fiber.

In another aspect the invention relates to an insulating cover member wherein the compressed fiber includes fibers that are compressed in an amount within the range of from about 50 percent to about 80 percent to a density within the range of from about 16 to about 50 pounds per cubic foot.

In still another aspect the invention is directed to a highly compressed fiber, as above described, as a new composition of matter. Other aspects of the invention are directed to the method of making an insulating roll cover, to the roll covers of the present invention which may contain additive for hardening the cover and to their method of manufacture. Still further invention aspects are directed to novel roll covers having the highly compressed fiber as an underlayer, or core, for an outer layer of refractory which can be a fiber-containing material.

DESCRIPTION OF THE PREFERRED EMBODIMENTS

Figure 1:
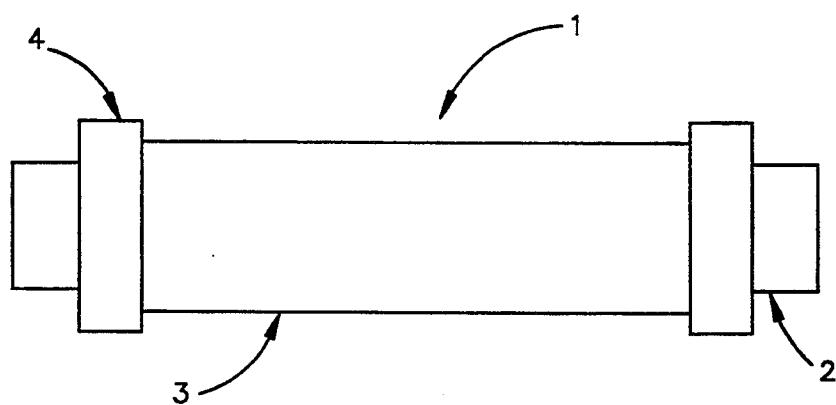
FIG. 1 is a perspective view of an insulating roll having a central shaft and fiber cover.

For the roller, at least one roller cover insulating layer will be provided by highly compressed, at least substantially ceramic fiber. It is often advantageous that this fiber be binder-free. Compressed, binder-containing fiber may be useful, and will be discussed further on hereinbelow. By "at least substantially ceramic fiber" it is meant that the fiber will be a major amount, i.e., greater than 50 weight percent, of ceramic fiber. The minor amount, i.e., under 50 weight percent, balance can be other synthetic or natural mineral fiber, e.g., glass fiber or mineral wool, including mineral wool with additives. Advantageously, for best roller performance without degradation under high heat application, the fiber will be at least about 80 weight percent ceramic fiber and preferably for best overall performance characteristics, will be all ceramic fiber.

Although it is contemplated that such ceramic fiber may not be a silica-containing fiber, as represented by alumina fiber or fiber of boron compound material, e.g., fibers of boron oxide, boron carbide and boron nitride, it is preferred for economy that the ceramic fiber be a silica-containing fiber. The silica-containing fiber may simply be silica fiber, although usually the silica is present with one or more of alumina, zirconia, chromia, or titania. Such silica-containing fibers are also meant to include fibers from silicon nitride, silicon carbide, calcium-aluminum silicate and the like. Advantageous fibers which have desirable inertness, i.e., non-reactivity with the working environment as well as with articles being conveyed over the roller, combined with a desirable insulating property can be prepared from silica and alumina. Improved high-temperature properties for ceramic fiber can be achieved when the silica and alumina are combined with zirconia or titania.

Typically, with commercially available fibers prepared from silica and alumina, the alumina content can vary in an amount of from about 45 to about 80 weight percent alumina with an about 20 to 55 weight percent balance of silica. Where additional substituents are utilized, e.g., zirconia, the constituent ranges can be further varied. Thus where zirconia may be present, it might contribute as little as about 3 weight percent. There can then be present, as taught in U.S. Pat. Nos. 4,558,015 and 4,555,492, silica in an amount from about 45 up to 75 weight percent or more, and alumina in an amount of as little as about 10 weight percent, up to nearly 40 weight percent. Moreover, the amount of zirconia in some formulations may exceed 20 weight percent. It will be understood that the fiber may be prepared by any process useful for preparing ceramic fiber. Commercially, such processes include those which fiberize a molten stream, e.g., blowing of a molten stream to fiberize the molten material, or causing the molten stream to impact rapidly spinning wheels which fiberizes the melt. Commercial manufacture also includes sol-gel processing.

As the fibers are produced, it will be typical that they will be initially accumulated together into a mat form. Such may be accomplished as by collecting random fibers on a continuous chain-mesh belt apparatus. The accumulated fibers that typically are collected on the mesh belt apparatus can then be needled or stitched together. For purposes of the present invention, these fibers in mat form, or when consolidated as by needling into blankets, can also be compressed, with or without the application of heat. Typically in accumulated form, the initial mats will have a density on the order of from about 2 to about 4 pounds per cubic foot, and after consolidating the fiber, the accumulated fibers as blankets will have a density on the order of from about 4 to 10 pounds per cubic foot for ceramic fiber. Any precompression in accumulating the fibers, as by heating or rolling, will still typically provide a blanket having a density of not above about 10 pounds per cubic foot.

The mats or blankets, the fiber in which may also be generally referred to herein as "bulk" fiber, can be stamped or cut into disc shape. Bundles of these discs, especially when stamped from a thin blanket, may then be precompressed into multiple-disc "sections" sometimes also referred to herein as "donuts". Typically, the initial blankets can have thickness from on the order of $\frac{1}{4}$ to $\frac{1}{2}$ inch, up to as thick as 6 inches. For the thinner ceramic fiber blankets which are usually $\frac{1}{4}$ inch up to about 1 inch thick, discs can be compressed into typically 1 inch to 4 inch thick sections. The thicker blanket discs may not be precompressed into sections. Upon compression into sections, which compression can be in an amount, as more particularly discussed hereinbelow, from about 50 percent to about 80 percent, the fiber may be compressed to a density that might vary, in broadest consideration and basis dry fiber, within the range of from about 16 to about 50 pounds per cubic foot.

As an example, a blanket prepared from a readily available commercial silica-alumina fiber and having an initial density, as formed, of 8 pounds per cubic foot, or "8-pound blanket", can be compressed 50 percent to a density of 16 pounds per cubic foot. More typically, fiber will be compressed to provide a density within the range of from about 18 to about 40 pounds per cubic foot. The same readily available commercial fiber 8-pound blanket compressed above about 60 percent can provide a fiber density of on the order of greater than 20 pounds per cubic foot. If compressed more toward the top of the range, e.g., 80 percent, such 8-pound blanket will have density approaching 40 pounds per cubic foot. For such commercial ceramic fiber prepared from silica and alumina, a greater than 20 pounds per cubic foot density, e.g., an about 22 to 40 pound per cubic foot range of density, is highly advantageous for best fiber insulating characteristic. It is to be understood that compression may be of wet or dry fiber, but unless otherwise specified, compressed fiber densities are to be understood to be for dry fiber.

For many applications it is most advantageous to utilize a bulk fiber since the individual fibers in the bulk fiber are of varying lengths. Such fibers of varying lengths enhance the ability of the fibers to intertwine and hold together under compression. For these applications using fibers of varying lengths, it is further desirable that all fibers have a length of at least about 0.5 inch, with long fibers usually having length within the range of from about 8 inches up to a length of about 10 inches. Usually only a very few fibers will be longer than about 10 inches, as such fibers can be difficult to work with, while fibers shorter than about 0.5 inch may be of insufficient length to effectively intertwine for these fibers of varying lengths. A particularly preferred fiber mixture for fibers of varying lengths has some individual short fibers at least about 2 to 4 inches long, in mixture with long fibers, i.e., longer than 4 inches and with lengths up to about 8 to 10 inches, often with fibers of at least about 6 to 8 inches in length.

It is however to be understood that in some applications it can be useful to employ milled fiber or chopped fiber, or both. Chopped fiber i.e., bulk fiber which has been chopped, can have individual fibers generally from 0.25 inch to one inch in length. Milled fiber, typically fiber that has been chopped and subsequently ball-milled, can be of extremely short, and more uniform length. Fiber lengths for milled fiber can be on the order of 10 to 30 microns. Although mixtures are contemplated for milled fiber with other fibers, e.g., one or more of chopped fibers or the above described fibers of varying lengths, it is to be understood that the milled fiber may be utilized by itself, such as in a hardcoat formulation, as will be described in detail hereinafter. Also, since milled fiber is not as subject to fiber crushing as are individual longer length fibers, the utilization of milled fiber can be particularly serviceable at elevated compression.

Figure 2:
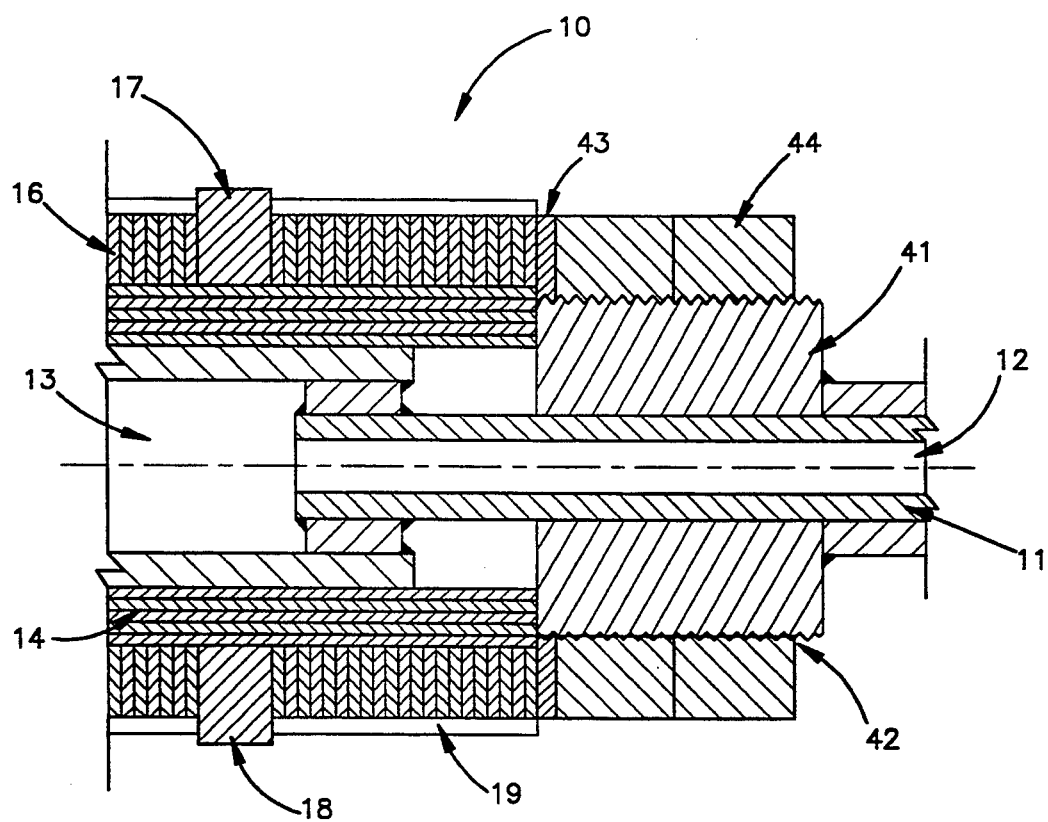
FIG. 2 is a view in section, a portion only, of an insulating roll of the present invention, the roll being a double-type roll variation containing a load bearing member in the cover and having a castable outermost layer.

Milled fiber may be used in applications in rollers where elevated shot content, or shot of enlarged size, or both, may be deleterious, such as rollers utilized with stainless steel strip in catenary lines where shot can lead to marking of the product. As the word is used herein, "shot" refers to the non-fibrous, and usually chunky, ceramic particles that are found in bulk ceramic fiber, e.g., ceramic fiber blanket. Typically, where long fibers that have individual fibers of varying lengths are used, the shot content retained on a 40 mesh screen (U.S. Sieve Series) may be as great as on the order of 2 to 5 percent, with particle size for individual pieces of the shot being as great as 100 microns. If such is of concern, a castable cover, more typically a hardcoat cover, as depicted in FIG. 2 and discussed hereinbelow, can be used as a shot containment coating. Also, use of milled fiber may enhance roller serviceability, since milling of the fiber tends to crush shot particles to a size of less than about 20 microns, thus reducing to eliminating concern for product marking. Chopped fiber can be similarly utilized in the manner of milled fiber, such as in mixture. Alone or in mixture it can be most serviceable in castable formulations such as in a shot containment coating. It can thus be especially useful where marking of the articles being conveyed across the roller is of concern.

It has not been industrial convention to substantially compress ceramic fiber owing to a concern for crushing the fiber. It has however now been found that discs of the fiber on a shaft can be highly axially compressed. Such compression for ceramic fiber should be in an amount from above about 50 percent up to most always about 80 percent, although slightly greater compression, i.e., 83 to 85 percent might be achieved. A compression of less than about 50 percent will not provide for a desirable dense fiber having the requisite resistance to compression at the roll surface as required in the industry. On the other hand, most always a compression of greater than about 80 percent may lead to fiber crushing. Advantageously for desirable roll strength and resistance to surface compression, the ceramic fiber will be compressed in an amount above about 55 percent, or more often above about 60 percent and preferably within a range of from about 65 to about 75 percent.

The amount of compression tolerated by the fiber without deleterious fiber crushing may be determined by the wet or dry condition of the fiber. In fiber production, the fiber can usually be expected to be in dry condition, and appear and feel dry to the touch, often owing to the elevated temperature conditions used in producing the fiber. In brief, wet fiber is fiber that has been wetted, such as with a lubricant, rigidizer or binder, each of which will be discussed hereinbelow, and the fiber can appear and feel wet to the touch. As a general rule, wet fiber can be more highly compressed without running as great a risk of fiber crushing. With dry fiber, a range of compression for ceramic fiber from above about 50 percent up to about 70 percent or possibly, as a most elevated compression, about 75 percent, will be advantageous. It is generally contemplated that wet fiber will be readily susceptible to compression across the full 50 percent to 80 percent compression range. However, even with wet fiber, compression from about 50 percent, up to about 70 percent, is preferred. By wet fiber, it is meant to include fiber which is simply wetted by water. More typically, a lubricant will be used. By use of the word "lubricant" herein there is meant the use of a substituent which will volatilize without providing more than an incidental residue in the roller, and preferably, no residue. Such volatilization will most always be complete at drying temperature, although some residual volatilization may be effected at the operating temperature of the roller. Generally, the lubricants are organic materials including organic liquids or organic substituents dispersed or solubilized in liquids. Soap dispersions can serve as useful lubricants. The lubricant can be applied to the fiber when the fiber is in mat form, by any means usually employed for applying a liquid to a porous solid, e.g., spray or dip application. It also may be useful to apply the lubricant to a disc or section that has been partially compressed. The lubricant can penetrate into the partially compressed fiber mass, as by wicking. The resulting lubricated fiber mass is then subjected to final compression.

For some applications it may be desirable to use a binder in the compressed fiber roll cover. Such may be a "fugitive binder", that is, a binder that will be readily susceptible to volatilization from the cover during drying of the cover or at elevated temperature use. Such fugitive binder may readily penetrate into the compressed fiber roll. It may also be referred to herein as an "organic binder", and representative such binders include starch, latex materials and cellulosic substituents, e.g., an aqueous suspension of cellulose methyl ether. The word "binder" may also refer to a substance which will not readily penetrate into the compressed fiber roll, such as by wicking, in appreciable amount. These binders, sometimes referred to herein as "inorganic binders", in general may be used with the fiber prior to or after compression. Representative inorganic binders include cements, calcium aluminate and clays. Thus, the inorganic binders are materials which will be present, at least as a residue in substantial amount, in the compressed fiber roll cover during use of the roll cover.

If the material used is capable of impregnating the compressed fiber roll, i.e., wicking into the compressed fiber roll, as well as also leaving a residue within the roll on drying and which will be retained in the roll for roller use, such material is referred to herein for convenience as a "rigidizer". Representative rigidizers are such as colloidal silica, colloidal alumina, colloidal zirconia, or similar liquid materials. Where the rigidizer used is in colloidal form, it may be referred to herein as a "colloidal rigidizer". The rigidizer may be applied to the fiber either before compression or after. The method used may be any of those typically employed for impregnating a fiber with a liquid, e.g., soaking or spraying or the like. Even for the most highly compressed fiber, i.e., the 80 percent fiber compression, a rigidizer mixture, e.g., a solution containing colloidal silica or colloidal alumina or both in a liquid vehicle, will readily impregnate the roll cover by capillary action, or "wicking", and can penetrate completely throughout the compressed ceramic fiber. It is however to be understood that such penetration may purposefully be limited to only an outermost layer of the compressed ceramic fiber, or that the impregnation will provide a gradation of the rigidizer, which can be most concentrated at the outer roller fiber surface.

Generally, the rigidizer composition will include colloidal silica such as a LUDOX® colloidal silica dispersion manufactured by E.I. DuPont de Nemours and Company. Such dispersions are understood to be a aqueous suspensions of sodium-stabilized, or ammonia or aluminum stabilized, silica particles, with ammonia stabilized being preferred, typically containing 40–50 weight percent solids, but may be more dilute, e.g., contain 20 weight percent solids. The colloidal silicas, which may also be referred to herein as silica sols, are generally the alkaline sols, e.g., having a pH of at least 8.5. They are understood to be composed of discrete dense spherical particles typically of silica. Suitable substitutes for silica in sol form can include ethyl silicates, silicate polymers, ethyl polysilicates and colloidal alumina such as aluminum oxide sol. It is to be understood that where a rigidizer composition such as a silica sol is to be used, such can be further modified to contain additional additives. These additives may include on the order of from as little as 0.1 weight percent of up to 5 weight percent or more, e.g., up to 10 weight percent, basis the weight of the rigidizer composition solids, of an additive such as an organosilane coupling agent, or a polymeric agent such as an acrylic polymer. It is also contemplated that compressing and rigidizing can be a multi-step process. For example a fiber roll may be compressed, e.g., at 50 percent compression, then penetrated with a rigidizer, then compressed further, as by up to as much as 80 percent. Additional rigidizer could then be added after the second compression step. Moreover, whenever the rigidizer is used, it can be used in a multi-step, impregnate-dry-impregnate operation terminating in a final drying step.

Generally, the rigidizer will be used in an amount to provide from about 5 weight percent up to about 70 weight percent or more, and preferably about 15 to 60 weight percent, of rigidizer residue after drying of the roll, in the total weight of the roll. After use, the resulting impregnated cover should be dried. Drying, as such term will generally be used herein, may be accomplished at quite elevated temperature, e.g., 500° C., but also such for economy will advantageously be at a more modest temperature such as from about 300° C. down to about 100° C. or below. After application of rigidizer, drying is preferably at such more modest temperature, e.g., about 200° C., for a time of up to about 24 hours, but more usually from about 8 hours to about 12 hours. Thereafter, the fiber cover may be further conditioned in a manner such as described hereinbelow. For example, the cover can be heat treated at an elevated temperature of as much as up to about 2000° F. for an impregnated ceramic fiber, thereby vaporizing any fugitive solvent or liquid vehicle of a rigidizer or of a binder and leaving the residue in the compressed fiber roll cover.

Referring then to the Figures, FIG. 1 shows a roll 1 comprised of a metal shaft 2 having a compressed fiber cover 3. The compressed fiber cover 3 is contained within end plates 4. The metal shaft 2 is supported and may be internally cooled all by means not shown. The end plates 4 maintain compression on the compressed fiber cover 3, also by means not shown.

Referring then to FIG. 2, a roll 10 has an inner shaft 11. This shaft 11 may be solid, but in the Figure is depicted as hollow providing a passageway 12 for entry of a cooling liquid feeding from a source not shown into the shaft 11. At the zone of the shaft 11 over which objects will be conveyed, the passageway 12 expands into a cooling chamber 13. At the end opposite from the cooling chamber 13, the shaft is supported and may be rotationally driven, all by means not shown. The outer portion of the metal shaft 11 is substantially covered along the axial direction of the shaft 11 with an inner core member 14 of compressed fiber discs. This fiber disc inner core member 14 can be held under compression by means of an end stud 41 which has an outer threaded surface 42. On top of the fiber disc inner core member 14 is an outer cover member 16 of compressed ceramic fiber discs. For maintaining end plate compressive pressure on the outer cover member 16 there is used a push ring 43 and threaded nut 44. Interspersed between these compressed fiber discs of this outer cover member 16 axially along the inner core member 14, is a load bearing member 17. This member is cushioned by the inner core member 14 and firmed in place by the outer cover member 16, which also permits for expansion and contraction of the load bearing member 17. The load bearing member 17 has an exterior surface 18. On the outer surface of the outer cover member 16 of compressed fiber discs is an outermost castable cover layer 19, which may also be referred to herein as a "shot containment coating". This outermost cover layer 19 can serve to contain shot in the outer cover member 16, if such is present. It is to be understood that these load bearing members 17, will have their exterior surface 18 raised above the castable cover layer 19, as for example in application where the roller 10 is used for conveying strip steel to a catenary furnace for annealing.

Figure 3:
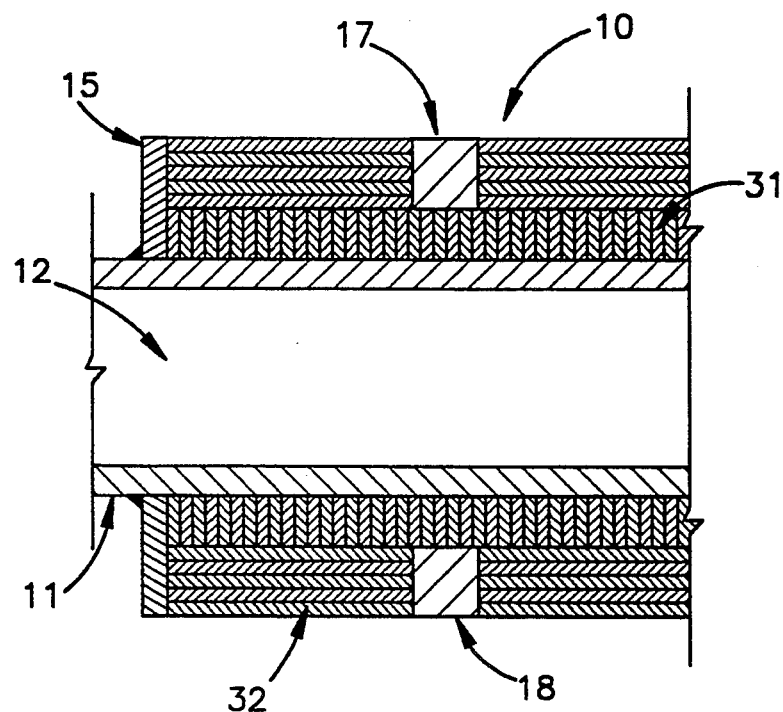
FIG. 3 is a partial view, in section, of an insulating roll of the present invention depicting a double type roll variation.

Referring next to FIG. 3 a roll 10 has a shaft 11, which is hollow, providing a passageway 12 for a cooling liquid. At the end of the roll 10 there is an end plate 15 secured by welding to the shaft 11. For insulation, this roll 10 has an inner, compressed fiber roll cover 31 prepared from compressed fiber discs (not shown), which inner cover 31 is compressed in direct contact with the metal shaft 11. Although this inner roll cover 31 will be referred to herein as the compressed fiber roll cover 31, it is to be understood that for some covers the inner roll may be obtained in a manner other than the compression discussed herein, e.g., by vacuum forming. On top of this inner, compressed fiber roll cover 31 is an outer compressed fiber roll cover 32. This particular roll construction of FIGS. 2 and 3, which may be referred to herein as a "double-type" roll, contains, for example, the inner roll cover 31 and the outer roll cover 32, of FIG. 3. Covers of such structure will be discussed again hereinbelow. Contained in the outer compressed fiber roll cover 3 is a load bearing member 17. This load bearing member 17 has an exterior surface 18 which is shown flush with the outer surface of the outer compressed fiber roll cover 32. This load bearing member 17 inwardly in a radial direction is seated on the inner roll cover 31. Additionally, it is to be understood that such double-type roll may initially have only compressed fiber for the outer roll cover 32. Then, a groove can be machined in this outer roll cover 32 and castable material is then cast or placed in the groove to serve as the load bearing member 17.

Figure 4:
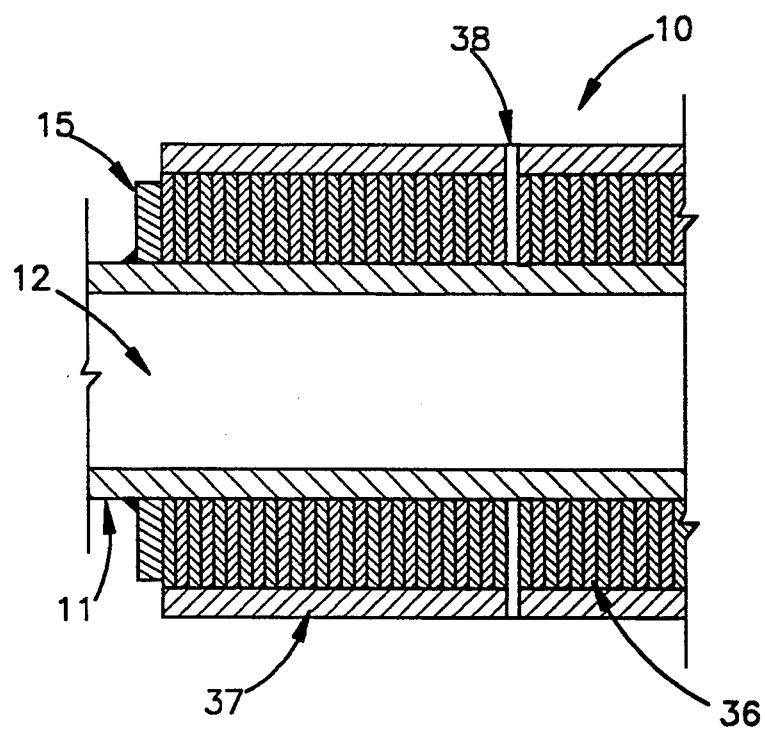
FIG. 4 is also a partial view, in section, of an insulating roll of the present invention having a hardcoat outer layer.

Referring then to FIG. 4, a roll 10 has a metal shaft 11 which contains a passageway 12 for a cooling liquid, not shown. At the end of the shaft 11 there is an end plate 15 secured to the shaft 11 by welding. Mounted directly on the outer surface of the shaft 11 is a compressed fiber roll cover 36 prepared from compressed fiber discs (not shown). Atop this compressed fiber roll cover 36 is an outer hardcoat layer 37. Hardcoats as will be serviceable for preparing such a hardcoat layer 37 are discussed in greater detail hereinafter. Also present around the metal shaft 11 are spacers 38. As depicted in the Figure, the spacer 38 extends through the compressed fiber roll cover 36 as well as the hardcoat layer 37. This spacer 38 can serve to add flexibility to the covering for the roll 10. Although the spacers 38 may take the general form of a load bearing member 17, they are however not load bearing members. The spacers 38 may be flush with, recessed, or raised above the outer surface of the compressed fiber. Suitable materials for such spacers include ceramic fiber board and fibers in accumulated form, especially those which have been made by the sol-gel process, as well as metals in foil form e.g., foil discs, with each separator being a compressed product of multiple, individual metal foil discs.

As depicted in FIG. 4, only the compressed fiber roll cover 36 abuts against the end plate 15. This not only maintains compression for the fiber roll cover 36, but also maintains placement for the spacer 38. In the assembly depicted, the hardcoat layer 37 is thus not under axial compression. Also, for a double-type roll, as depicted in FIG. 2, the stud 41 abutting against only the inner core 14 may be in fixed position. Then the outer cover 16 is compressed against the push ring 43 and under adjustable compression from the threaded nut 44. In this manner, the inner roll cover 14 and outer roll cover 16 can be maintained under differing compression. Understandably, at the opposite end of the roll the end plate may be the same for both the inner core member 14 and outer cover member 16, and may be fixed, as the welded plate 15 of FIG. 3. The nut 44 of FIG. 2, can then permit adjustable compression for the outer cover member 16, which compression may be adjusted during use of the roll 10.

Figure 5:
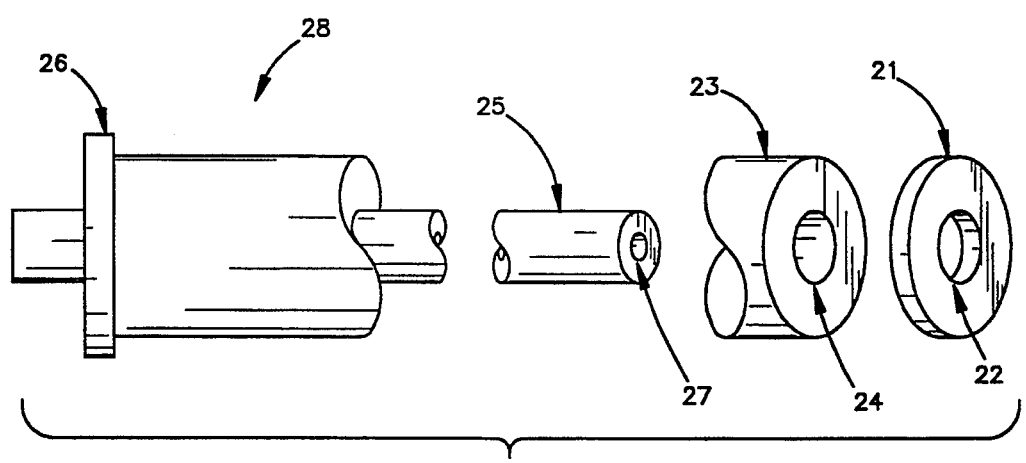
FIG. 5 is an exploded view depicting the assembly of fiber discs into fiber sections and then into roll cover preparation.

Referring then to FIG. 5, a representative fiber disc 21, such as a needled disc of silica-containing ceramic fiber, is accumulated with a substantial additional number of like discs 21. By use of the term "disc" herein it is meant an object of most usually circular outer diameter, although it is to be understood that the disc may be of differing shape. For example, the disc may be oval or out of round to provide a cam affect, or possibly contain edges or ridges, such as to provide a ratchet affect. In this regard then, it is contemplated that the outer parameter will most always ascribe a substantially circular configuration. The disc 21 has an at least substantially centrally located disc aperture 22. Typically the disc 21 will have an aperture 22, in this case circular, that has an aperture dimension, in this case a diameter dimension, that extends within the range from about 0.5 inch to about 8 inches. However, other aperture shape, such as hexagonal, may be useful whereby the aperture dimension will be across the center of the disc from flat-to-flat.

As discussed hereinbefore, these discs, which are precompressed into sections, will typically have a thickness axially of at least about ¼ inch usually to about 1 or 2 inches, although discs of axial thickness of as great as 8 inches are contemplated. It is to be understood that especially for these discs 21 of greater axial thickness, such may be precompressed even before they are compressed into sections 23. Usually there will be a width of fiber, measured outwardly, from the center of the discs 21 of at least about 1 inch, and can be up to about 4 to 6 inches, or more, e.g., 12 inches, extending from the outer edge of the disc aperture 22 to the outermost perimeter of the disc 21. Such outermost perimeter will generally extend, as measured by the length of a line through the center of the disc 21, from about 2 inches to about 3 feet, which generally because of the preferred circular shape of the disc 21 will be referred to herein as a diameter of from about 2 inches to about 3 feet.

A bunch of these fiber discs 21 which are usually of lesser blanket thickness are then compressed to provide a fiber section 23. Such a fiber section 23 can be prepared from the fiber discs 21 by compressing the discs 21. This compression can be undertaken by any means generally useful for compressing fiber, e.g., by the use of air or hydraulic pressure. Although precompressing of fiber sections will almost always be handled on the shaft, it is to be understood that sometimes compressed fiber sections will be otherwise formed and then placed on the shaft. The fiber section 23 will usually be compressed in an amount from about 50 percent to about 80 percent to provide a fiber density within the range from about 16 to about 50 pounds per cubic foot. The resulting fiber sections 23 are then at least substantially similar in shape to the fiber discs 21, e.g., have a section aperture 24 dimension as well as total section diameter dimension as for the disc 21. As mentioned hereinabove, these precompressed sections 23 will have axial thickness typically within the range from about 1 inch to about 4 inches, although they may be much thicker, e.g., up to almost 2 feet. The use of adhesives or other means to prepare these sections 23 is often avoided. When such are avoided, the resulting roll cover may be completely additive-free in use.

The sections 23 are then accumulated onto a metal shaft 25 by simply sliding the section 23 over the shaft 25 so that the shaft passes through the aperture 24. The shaft 25 at its far end is equipped with an end plate 26. Typically, the metal shaft 25 will have a hollow, at least substantially centrally located aperture 27 which can be used for the passage of cooling fluid, not shown. When a substantial number of sections 23, e.g. on the order of a dozen or more, have been assembled in a loose pack on the shaft 25, a moveable end plate, not shown, is moved against the last-on section 23 in a manner opposing the end plate 26. Pressure can then be brought on the fiber sections 23 by the end plates in any manner convenient for compressing the fiber sections together. For example, threaded rods can connect the end plates and an air wrench can be used to tighten bolts at the end of the rods to gradually bring the end plates closer and closer together. Or hydraulic cylinders can be used to press against end plates, thereby obviating the need for threaded rods. After compression of the sections 23 by such procedure, a locking ring, not shown, can be used to replace the movable end plate and the procedure can be repeated of sliding an assembly of fiber sections 23 onto the shaft 25 with the subsequent reapplication of the movable end plate and then applying pressure. It is to be understood that for the discs 21, and particularly for discs 21 prepared from thicker blanket, e.g., blanket on the order of from about 4 inches to 6 inches thick, that such discs 21 can be placed directly on the shaft 25. Pressure will be brought against these discs without need for precompression into sections. When a roll 28 of desired length has been assembled, the movable end plate can be replaced by a permanent end plate. It is contemplated that any hard, high temperature resistant material may serve for the central shaft 25, e.g., a ceramic or metal shaft such as an iron shaft. The material should also be non-porous and liquid confining if a hollow shaft is used along with a coolant. However, for economy the shaft will most always be a metal shaft and advantageously for best economy a steel shaft. Where internal cooling is employed, such can be accomplished by means of a circulating fluid, which for economy is preferably water or air. It is well recognized that these shafts in use can warp, particularly under upset conditions. The outer coverings with their insulating character, thus desirably enhance the service life of the roll. Although the shafts herein have all been shown to be circular in cross-section, it is to be understood that other forms, e.g., square or hexagonal, can also be useful.

Where load bearing members 17 are used, which members 17 may also be referred to herein as "tires", these can be made from any high temperature resistant, as well as shrinkage resistant, and hard material such as a ceramic or metal. It is important that such load bearing member 17 be capable of accepting and maintaining a smooth exterior surface 18. Many materials can or have been used for these load bearing members 17 in industry. However, it is most usual to manufacture these load bearing members 17 of ceramic material such as a silica. Fused silica is resistant to shrinkage and has virtually no coefficient of expansion under the typical operating conditions of the roll. These characteristics make fused silica particularly attractive for this application. Other materials that may be used include steel, mullite, fiber board, cordierite or other castable material in addition to the just discussed fused silica, hardcoat and binder.

It should be understood that in addition to using fused silica or the like, e.g., alumina or zirconia or combination including such materials, as a load bearing member 17, such is representative of materials which also may be utilized as a sleeve. By use of the word "sleeve", it is meant an item that can be slid over some to all of the outer surface of the compressed fiber cover. U.S. Pat. No. 3,751,195 discusses a sleeve of fused silica particles interbonded with colloidal silica or cement. It is to be understood that the fused silica sleeve material of this patent may be cast directly on an underlying compressed fiber layer and cured thereon. Whether employed as a sleeve, or as a tire, or whether directly cast on underlying fiber, the fused silica or the like will serve to extend the wear life of the roll, since the sleeve bears the weight of objects that are being transported over the roll. Such a sleeve, or tire (load bearing member), or direct cast material, can be prepared from a composition which will generally be referred to herein as a "castable" material.

As the term is used herein, "castable" material means any material which can be hardened to form a load bearing sleeve or tire, or such material cured directly on an underlying compressed fiber layer. The material can be cast directly over the compressed ceramic fiber roll cover, such as to provide an outer cover wear tread. Thus, particularly for such material, radial compression may be used with such roll, or at least constraint can be used in a radial direction, as where the material is cast over the ceramic fiber. However, it will be understood that in general the ceramic fiber will be subjected to axial compression, although it is contemplated that a combination of axial compression with radial compression, or constraint, may be used. In addition to including ceramics such as fused silica, such castable materials may typically be made from formulations containing silicates, e.g., sodium silicate or zirconium silicate, in combination with oxides, such as aluminum oxide or magnesium oxide, as well as be typically made from cermets, or from cement or clay, which might be in mixture with additional ingredients such as ceramic fiber and talc. Where the material specifically includes a rigidizer plus ceramic fiber, usually chopped fiber or milled fiber, or both, which material is typically cast on underlying compressed fiber, this specie of castable material will most always be referred to herein for convenience as a "hardcoat". Such a hardcoat provides a particularly desirable shot containment coating 19 as depicted in FIG. 2.

For example, U.S. Pat. No. 4,174,331 discloses a hardcoat composition comprising ceramic fiber, silica and an adhesion agent such as an acrylic polymer or cellulose material. As formulated, a preferred hardcoat can contain milled ceramic fiber, usually in a major weight amount for the hardcoat fibers, and chopped ceramic fiber in minor weight amount. Some additional fibers, e.g., carbon fiber may also be present. Such preferred hardcoat may contain from about 70 to about 95 weight percent, and more often 75–85 weight percent, of milled fiber, 5 to 25 weight percent, and most always 13–23 weight percent, of chopped fiber and a balance up to about 5 weight percent carbon fiber. Usually there will be on the order of about 2 weight percent or less of carbon fiber in this preferred composition. Since the carbon fiber may burn out as the formulation is dried, the retained hardcoat composition may then contain the other fibers in slightly differing amount, e.g., more on the order of about a 75 weight percent minimum for milled fiber. In this composition, it is desirable to have the milled fiber be prepared by a process which fiberizes a molten stream, and then have the chopped fiber prepared by the sol-gel process. For such preferred hardcoat, the rigidizer used will be a colloidal rigidizer. In formulating the hardcoat, this colloidal rigidizer will advantageously contribute from about 20 to about 60 weight percent of the hardcoat composition formulation, basis a rigidizer of 40 weight percent solids. Hence, such rigidizer can be expected to provide an about 8–24 weight percent of solids in the dry hardcoat. Preferably, the colloidal rigidizer will be present in an amount from about 30 to about 50 weight percent of such wet formulation.

A castable composition of particular interest includes rigidizer plus chopped ceramic fiber together with binder. More particularly, the rigidizer employed will be colloidal rigidizer. Typically, the rigidizer will supply from about 20 weight percent to about 60 weight percent of the total wet formulation, i.e., about 8 to 24 weight percent of the final product, solids basis, for a 40 weight percent solids colloidal rigidizer. More often, the rigidizer will supply from about 30 to about 50 weight percent of the formulation. Another substantial ingredient will be chopped ceramic fiber. Usually this will be fiber prepared by the sol-gel process. This fiber may be present in the final solid product in an amount from about 20 to about 40 weight percent of the total formulation. Then a binder such as calcium aluminate can be present in an amount from about 35 to about 60 weight percent of the formulation. Frequently a combination of binder ingredients will be used, e.g., calcium aluminate with talc. In such instances, the second binder ingredient, i.e., the talc, will typically supply about 5 weight percent of the total formulation.

After such a roll 28 has been freshly assembled, the outer surface of the roll may be rough. It can then be worked to provide a hardened, as well as smooth, outer roll fiber surface. For example, the outer surface of the ceramic fiber can be smoothed by burnishing the fiber, usually after machining, or after machining plus grinding. This may be achieved by forcing a highly polished rotatable metal element forcefully against the fiber surface and then moving this burnishing tool back and forth against the fiber roll as the fiber roll is being rotated. Smoothing can not only provide for a highly desirable smooth and uniform surface, but can also serve to improve and harden the fiber cover at its outer surface. This outer surface working can also be utilized to provide indentations in the fiber cover, e.g., so as to provide a textured outer appearance that can serve to offer better gripping of the cover with the product moving across the roll cover. After any outer surface working, including machining or grinding, the fiber cover may then be further conditioned, e.g., heat treated as by laser annealing, at an elevated temperature such as within the range of from about 1000° F. to about 2000° F. for ceramic fiber. Such heat treatment may be performed before or after working, e.g., burnishing. Advantageously for economy, no such further conditioning is generally necessary.

The fiber cover, without using rigidizer or binder, and without an outer sleeve or layer of castable material, will provide a dense, impact resistant and thermally stable surface. Moreover, the super compressed cover now achieved can exhibit minimal shrinkage in use, e.g., on the order of merely 2 to 4 percent or less. This minimal shrinkage will desirably retard, and can even eliminate, the separation of individual compressed fiber discs during roll use.

The compressed fiber cover, without using rigidizer or binder, will typically not register hardness on testing with a Schmidt hammer, which may also be referred to herein as an "H-Meter". Thus for some applications it will be desirable to use rigidizer or binder in the compressed fiber cover to obtain a more hardened surface. For example, a commercial silica and alumina ceramic fiber of intertwined varying length fibers, and compressed to about 60% compression can have enhanced surface hardness by rigidizer application. For a single application of rigidizer to such fiber, or "single dip", the compressed fiber roll surface after drying will usually have a surface hardness within the range of from about 10 to about 20, as measured by Schmidt hammer using the R scale in a range of 1,500 to 10,000 pounds per square inch. Where, after drying, the resulting rigidized fiber is subjected to a second application of rigidizer, also termed "double dipping", the hardened surface, after drying, will typically have a surface hardness within the range of from about 20 up to about 40, as measured by Schmidt hammer. Additional dipping is also contemplated, with drying between each dipping operation. Thus, the compressed fiber roll cover lends itself well to adjustment of surface hardness by rigidizer application, and thereby lends itself well to tailoring the surface hardness for the particular industrial use of the ceramic fiber roller.

As has been noted hereinabove, particularly in connection with FIG. 3, the roll cover may have an inner, more flexible core covering the roller shaft, with an outer, more rigid outer cover. This may be achieved with an inner, compressed fiber core. It is to be understood that this inner fiber core may be a wrapped fiber core, achieved as by wrapping strips of blanket around the shaft. This core may be compressed, as by radial compression for a wrapped fiber core, or axial compression for a fiber core from discs. Compression for the core can be reduced compression, e.g., compressed at below about 60 percent. Such inner core may or may not contain one or more of lubricant, binder, or rigidizer. On this more flexible core there can be fabricated or placed a sleeve, as discussed hereinabove. Such also might be a more highly compressed fiber, e.g., compressed above about 60 percent, or a highly compressed fiber containing rigidizer or binder, or both. Particularly where the outer cover member is highly compressed fiber, it is to be understood that such may be used over a variety of core materials, e.g., including fiber board materials. In the service, the outer cover member may even serve as a recap on a commercial roller, including used rollers. Such manufacture will then combine the desirable heat insulation characteristic for both the inner and outer members, which may be combined with flexibility offered by the inner core, coupled with a desirable wear surface for the outer member.

The following examples show ways in which the invention has been practiced. However, these examples should not be construed as limiting the invention.

EXAMPLE 1

A commercial ceramic fiber, prepared by the blown melt fiberizing of a molten stream of a melt composed of 56 percent alumina and a balance essentially silica, is consolidated into blanket form by needling. The blanket contains fibers of varying lengths including short fibers having lengths from on the order of from 2 to 4 inches together with long fibers having length up to 10 inches. The fiber is 8-pound blanket having a thickness of one inch. This blanket is used to prepare discs by stamping discs from the blanket. The discs have a six inches outer diameter and a 3 1/16 inch inner diameter over the flats of a hexagonal shaft. Thereafter 278 of these discs are accumulated onto the shaft, using ¼ of the discs for each disc section. The steel-hexagonal shaft has a 3 inch outer diameter over the flats and was hollow for air cooling. The initial ¼ section of discs is compressed against a fixed end plate for the roll, such as depicted in FIG. 5, at a pressure of about 65 percent. This section is then locked on the shaft and the second ¼ section of discs is compressed to about 65 percent on the shaft and locked. After all 4 sections were similarly compressed, the resulting roll had an axial compressed cover length along the roll of 92⅝ inches.

The resulting dry cover was then dipped in a 40 percent solids silica sol (Nalco 2327, Nalco Chemical Company) for a 45 minute soak. Afterwards the roll was dried for about 8 hours at 200° F. This same dip and dry procedure was repeated a second time, but the roll was dried for 12 hours at 300° F. The roll was then turned, i.e., machined for initial smoothing of the roll surface, then grinding to complete this operation, resulting in a roll having an outer roll diameter of 5 3/16 inches.

This roll, plus a companion roll manufactured in the same manner, were then installed as a bottom pair of rolls in a vertical glass drawing machine containing 18 pairs of rolls. In this application, the rollers proceeded for over two months of commercial operation, free from any deleterious cracking or shrinkage, thereby demonstrating serviceability for these rolls in this application.

EXAMPLE 2

The commercial ceramic fiber employed was as described in Example 1. The 8-pound blanket from this fiber, having one inch thickness, was used to prepare discs by stamping. The discs had a 6 inches outer diameter and a 4 inches inner diameter. Thereafter, in the manner described in Example 1, a total of 180 of these discs are accumulated onto a shaft to provide a resulting roll having an axial compressed cover length along the roll of 60 inches. The shaft was a steel shaft, which was round in shape having a 4 inches outer diameter and was hollow for air or water cooling. Processing to this point provided an inner core of compressed ceramic fiber discs.

The outer core of ceramic fiber was likewise prepared from 8-pound blanket discs having one inch thickness. These discs for the outer cover had a 10 inches outer diameter and a 6 inches inner diameter to fit over the inner core. These outer cover discs were likewise compressed, and over the inner core, but after each quarter of the discs, a tire was inserted along with the outer discs, thereby providing three tires for the roll. Both mullire and cordierire tires were used. The tires had a 10½ inches outer diameter and a 6 inches inner diameter. They also had a 1½ inch width. As shown in FIG. 2, upon completion of compression of the outer ring, a steel push ring is placed against the end of the compressed outer fibers and a threaded nut is then tightened against the steel push ring to maintain the axial compression on this outer fiber ring. After completion of this outer cover, the resulting roll had an axial compressed cover length, including the three tires, of 60 inches.

There was thereafter cast onto the outer cover a hardcoat layer. During coating, the outer surfaces of the tires were masked with pressure sensitive tape. The hardcoat employed was a commercial adhesive cement containing sodium silicate and aluminum oxide and available from Sauereisen Cements. This composition was cast onto the cover by pouring the hardcoat onto the cover and smoothing by hand troweling. The resulting hardcoat cover was then dried at 300° F. for 12 hours. The resulting roller, with water cooling, then proceeded through 24 hours of test operation. In the test, the roll was continuously rotated in a furnace at a temperature of 1600° F. for 12 hours and then 2200° F. for 12 hours. After such testing, this double-layer roll with hardcoat outer layer and load bearing tires, was judged to be a highly-serviceable roll.

We claim:

1. A roller cover which comprises at least one dense and refractory, elevated temperature resistant annular insulating cover member of a highly compressed at least substantially ceramic fiber, said fibers being compressed from their original volume in an amount within the range of from about 50 percent to about 80 percent to a fiber density, basis dry fiber, within the range of from about 16 to about 50 pounds per cubic foot.

2. The roller cover of claim 1, wherein said annular cover member is compressed fiber comprising ceramic fiber plus rigidizer.

3. The roller cover of claim 2, wherein said annular cover member comprises compressed fiber plus one or more of colloidal silica, colloidal alumina, colloidal zirconia or silane.

4. The roller cover of claim 1, wherein said annular cover member is compressed fiber comprising ceramic fiber plus binder.

5. The roller cover of claim 4, wherein said cover member comprises fiber plus one or more of cement, starch, clay, calcium aluminate, latex materials or cellulosic substituents.

6. The roller cover of claim 1, wherein said highly compressed fiber is at least substantially enveloped by a load bearing sleeve of refractory castable material.

7. The roller cover of claim 6, wherein said castable material is a hardcoat comprising milled fiber plus colloidal rigidizer.

8. The roller cover of claim 1, wherein said annular, insulating cover member includes an inner, more flexible and less highly compressed ceramic fiber core member which has an outer, more rigid and more highly compressed outer ceramic fiber cover member.

9. The roller cover of claim 8, wherein said inner core member is compressed in an amount below about 60 percent and said outer cover member is compressed in an amount above about 60 percent.

10. A roller cover which comprises at least one dense and refractory, elevated temperature resistant annular insulating cover member of a highly compressed at least substantially ceramic fiber, said fibers being compressed from their original volume in an amount above about 50 percent to a fiber density, basis dry fiber, above about 16 pounds per cubic foot.

11. The roller cover of claim 10, wherein said annular cover member has fibers compressed in an amount up to 85 percent.

12. The roller cover of claim 10, wherein said annular cover member has fibers compressed in an amount above about 55 percent.

13. The roller cover of claim 10, wherein said annular cover member has fibers compressed in an amount above about 60 percent.

14. The roller cover of claim 10, wherein said annular cover member is compressed to a fiber density, basis dry fiber, above about 20 pounds per cubic foot.

15. The roller cover of claim 10, wherein said annular cover member is compressed to a fiber density, basis dry fiber, above about 22 pounds per cubic foot.

16. The roller cover of claim 10, wherein said compressed cover provides a smooth and compressed, outer weight bearing roller fiber surface for contact with roller conveyed articles.

* * * * *